(12) United States Patent
Martin

(10) Patent No.: US 7,818,822 B2
(45) Date of Patent: Oct. 26, 2010

(54) TOILET TANK WATER PURIFIER

(75) Inventor: Ronald Martin, Chelmsford, MA (US)

(73) Assignee: Zuvo Water, LLC, Mountain View, CA (US)

( * ) Notice: Subject to any disclaimer, the term of this patent is extended or adjusted under 35 U.S.C. 154(b) by 570 days.

(21) Appl. No.: 11/777,748

(22) Filed: Jul. 13, 2007

(65) Prior Publication Data
US 2008/0010731 A1  Jan. 17, 2008

Related U.S. Application Data

(60) Provisional application No. 60/807,301, filed on Jul. 13, 2006.

(51) Int. Cl.
E03D 9/04 (2006.01)

(52) U.S. Cl. ............................ 4/213; 4/227.1
(58) Field of Classification Search ................ 4/209 R, 4/227.1, 213, 217
See application file for complete search history.

(56) References Cited

U.S. PATENT DOCUMENTS

| | | | |
|---|---|---|---|
| 2,405,494 A * | 8/1946 | Dupuy | 96/340 |
| 2,970,821 A | 2/1961 | Axt | 261/16 |
| 3,336,099 A | 8/1967 | Czulak et al. | 21/102 |
| 3,550,782 A | 12/1970 | Veloz | 210/192 |
| 3,696,932 A | 10/1972 | Rosenberg | 210/437 |
| 3,726,404 A | 4/1973 | Troglione | 210/139 |
| 4,031,574 A * | 6/1977 | Werner | 4/213 |
| 4,069,153 A | 1/1978 | Gunther | 210/64 |
| 4,141,830 A | 2/1979 | Last | 210/63 Z |
| 4,176,061 A | 11/1979 | Stopka | 210/63 Z |
| 4,179,616 A | 12/1979 | Coviello et al. | 250/527 |
| 4,230,571 A | 10/1980 | Dadd | 3/8 |
| 4,273,660 A | 6/1981 | Beitzel | 210/760 |
| 4,274,970 A | 6/1981 | Beitzel | 210/748 |
| 4,323,810 A | 4/1982 | Horstmann | 313/24 |
| 4,422,450 A | 12/1983 | Rusteberg | 128/62 A |
| 4,437,999 A | 3/1984 | Mayne | 210/748 |
| 4,590,629 A * | 5/1986 | Lusk | 4/213 |
| 4,694,179 A | 9/1987 | Lew et al. | 250/431 |
| 4,752,401 A | 6/1988 | Bodenstein | 210/746 |
| 4,857,204 A | 8/1989 | Joklik | 210/695 |
| 4,892,712 A | 1/1990 | Robertson et al. | 422/186 |

(Continued)

FOREIGN PATENT DOCUMENTS

DE  3828026 A1  2/1990

(Continued)

OTHER PUBLICATIONS

Article entitled, "Fountainhead Technologies Talks About Their Unique Approach to Catalytic Water Purification", The Catalyst Review, Nov. 1994, pp. 1, 7-9.

*Primary Examiner*—Gregory L Huson
*Assistant Examiner*—Janie Christiansen
(74) *Attorney, Agent, or Firm*—Pillsbury Winthrop Shaw Pittman LLP

(57) ABSTRACT

Electrically energized apparatus mounted within the water tank of a conventional flush toilet draws air from the toilet bowl into a plenum to expose the air to UV radiation to produce ozone molecules that have an oxidizing effect on organic matter and to serve as a germicide and a virucide. The ozone enriched air is entrained in the water present in the toilet tank.

26 Claims, 1 Drawing Sheet

U.S. PATENT DOCUMENTS

| | | | |
|---|---|---|---|
| 4,913,827 A | 4/1990 | Nebel | 210/748 |
| 4,968,437 A | 11/1990 | Noll et al. | 210/748 |
| 5,043,079 A | 8/1991 | Hallett | 1/32 |
| 5,082,558 A | 1/1992 | Burris | 210/167 |
| 5,106,495 A | 4/1992 | Hughes | 210/139 |
| 5,106,501 A | 4/1992 | Yang et al. | 210/266 |
| 5,120,450 A | 6/1992 | Stanley, Jr. | 210/748 |
| 5,141,636 A | 8/1992 | Flanagan et al. | 210/209 |
| 5,158,454 A | 10/1992 | Viebahn et al. | 433/82 |
| 5,169,606 A | 12/1992 | Batchelor | 422/186.19 |
| 5,178,755 A | 1/1993 | LaCrosse | 210/195 |
| 5,178,758 A | 1/1993 | Hwang | 210/256 |
| 5,180,499 A | 1/1993 | Hinson et al. | 210/706 |
| 5,207,993 A | 5/1993 | Burris | 422/256 |
| 5,213,773 A | 5/1993 | Burris | 422/256 |
| 5,230,792 A | 7/1993 | Sauska et al. | 1/32 |
| 5,266,215 A | 11/1993 | Engelhard | 210/748 |
| 5,268,104 A | 12/1993 | Masoomain | 210/638 |
| 5,302,298 A | 4/1994 | Leitzke | 210/748 |
| 5,352,369 A | 10/1994 | Heinig, Jr. | 210/760 |
| 5,369,810 A * | 12/1994 | Warren | 4/213 |
| 5,431,861 A | 7/1995 | Nagahiro et al. | 261/140.1 |
| 5,520,893 A | 5/1996 | Kasting, Jr. et al. | 422/305 |
| 5,540,848 A | 7/1996 | Engelhard | 210/748 |
| 5,547,590 A | 8/1996 | Szabo | 210/748 |
| 5,709,799 A | 1/1998 | Engelhard | 210/748 |
| 5,935,431 A | 8/1999 | Korin | 210/205 |
| 5,942,125 A | 8/1999 | Engelhard et al. | 210/748 |
| 6,267,895 B1 | 7/2001 | Engelhard et al. | 210/748 |
| 6,461,520 B1 | 10/2002 | Engelhard et al. | 210/748 |
| 6,491,879 B2 | 12/2002 | Conrad | 422/186.18 |
| 6,511,594 B2 | 1/2003 | Shaw | 210/120 |
| 6,511,638 B2 | 1/2003 | Matsuzaki | 422/186.18 |
| 7,211,187 B2 * | 5/2007 | Lumbert | 210/153 |
| 2005/0138720 A1 * | 6/2005 | Shim | 4/213 |

FOREIGN PATENT DOCUMENTS

| | | | | |
|---|---|---|---|---|
| EP | 0 227 266 | 7/1987 | | |
| EP | 0 235 315 | 9/1987 | | |
| EP | 0 316 687 | 5/1989 | | |
| JP | 02027030 A * | 1/1990 | | |
| JP | 3-143586 A | 6/1991 | | |
| JP | 4-141296 A | 5/1992 | | |
| WO | PCT/US94/03689 | 11/1994 | | 1/32 |
| WO | PCT/US99/13591 | 12/1999 | | 2/8 |
| WO | PCT/US00/13839 | 11/2000 | | 35/6 |

* cited by examiner

TOILET TANK WATER PURIFIER

CROSS REFERENCE TO RELATED APPLICATIONS

The present application is related to and claims priority to a provisional application entitled "APPARATUS AND METHOD FOR OZONATING WATER IN A TOILET TANK", filed Jul. 13, 2006, and assigned Ser. No. 60/807,301, disclosing an invention by the present inventor and related to an application entitled "TOILET BOWL ODOR ELIMINATOR" filed Mar. 14, 2006 and assigned Ser. No. 11/374,792 and assigned to the present assignee.

BACKGROUND OF THE INVENTION

1. Field of the Invention

The present invention relates to apparatus for removing odors from toilet bowls and, more particularly, to apparatus for subjecting gases attendant a toilet bowl to ultraviolet radiation and ozone and injecting the gases into the water in a toilet tank.

2. Description of Related Prior Art

Conventional flushing toilet bowls used throughout the world release odorous gases into the room upon use. A common solution to this problem is actuation of an exhaust fan to exhaust air and gases from the room through a ceiling mounted exhaust fan. Such exhaust fans may also be located in the walls or ceiling of the room. These exhaust fans cause odorous gases to flow around and about an occupant and his/her clothing and some of the gases may permeate such clothing and hair of the user with socially unacceptable results. Moreover, the odorous gases are almost never exhausted completely by the time a user opens the bathroom door and some of the gases migrate therethrough into an adjoining area.

One of the most unpleasant effects of odorous gases is that a subsequent user of a toilet is often subjected to the presence of the gases which emanated from a previous user.

When a conventional toilet is flushed, a fine mist or aerosol is often created. Such a mist or aerosol will contain potentially harmful bacteria and viruses that will migrate throughout the adjacent area. This creates a potential health hazard to a subsequent occupant entering or within the adjacent area. Test results indicate that such a mist or aerosol may be present for up to two hours.

SUMMARY OF THE INVENTION

In an initial phase of use of a conventional flush toilet incorporating the present invention, air is drawn from the toilet bowl through a stand pipe within a water tank and irradiated by an ultraviolet lamp. Such irradiation has the beneficial effect of killing bacteria and viruses that may be present and producing ozone molecules which have a tendency to oxidize organic material present. The irradiated gases, including ozone enriched air, are discharged into the water in the water tank through a sparger or the like to entrain the gases in the water, which results in ozonation of the water. To render the apparatus essentially self contained, it may be mounted within the head space in the toilet tank and elements thereof are battery operated to avoid any electrical hazard. A control panel may be used to initiate operation and thereafter function automatically or each operation may be manually energized and de-energized.

It is therefore a primary object of the present invention to provide a self contained apparatus for purifying the water in a water tank of a flush toilet.

Another object of the present invention is to provide apparatus that can be totally contained within a conventional tank of a flush toilet that eliminates odors emanating from the toilet bowl.

Yet another object of the present invention is to provide an adjunct to a conventional flush toilet that eliminates odors and purifies the water prior to a flush.

Yet another object of the present invention is to treat the water going into the bowl of a flush toilet.

Still another object of the present invention is to provide apparatus mounted within a conventional tank of a flush toilet that irradiates and ozonates gases drawn from a toilet bowl and introduces ozone enriched air into the water in the tank.

A further object of the present invention is to provide an add on apparatus for any conventional flush toilet that will eliminate odors generated during use of the toilet.

A further object of the present invention is to provide a method for treating water flowing into a toilet bowl.

A yet further object of the present invention is to provide a method for eliminating odors emanating from a toilet bowl.

A still further object of the present invention is to provide a method for irradiating and ozonating gases generated within a toilet bowl during use and discharging such gas into the water in the water tank.

A still further object of the present invention is to provide ozonated water in a toilet tank for discharge into the toilet bowl to oxidize, destroy and reduce residual germs, bacteria and organic matter that are retained in the microstructure of the ceramic of the toilet bowl and thereby keep the toilet bowl cleaner.

These and other objects of the present invention will become apparent to those skilled in the art as the description thereof proceeds.

BRIEF DESCRIPTION OF THE DRAWINGS

The present invention will be described with greater specificity and clarity with reference to FIG. 1 which illustrates a representative and functional view of the present invention mounted within the water tank of a conventional flush toilet.

DESCRIPTION OF THE PREFERRED EMBODIMENT

Figure 1:
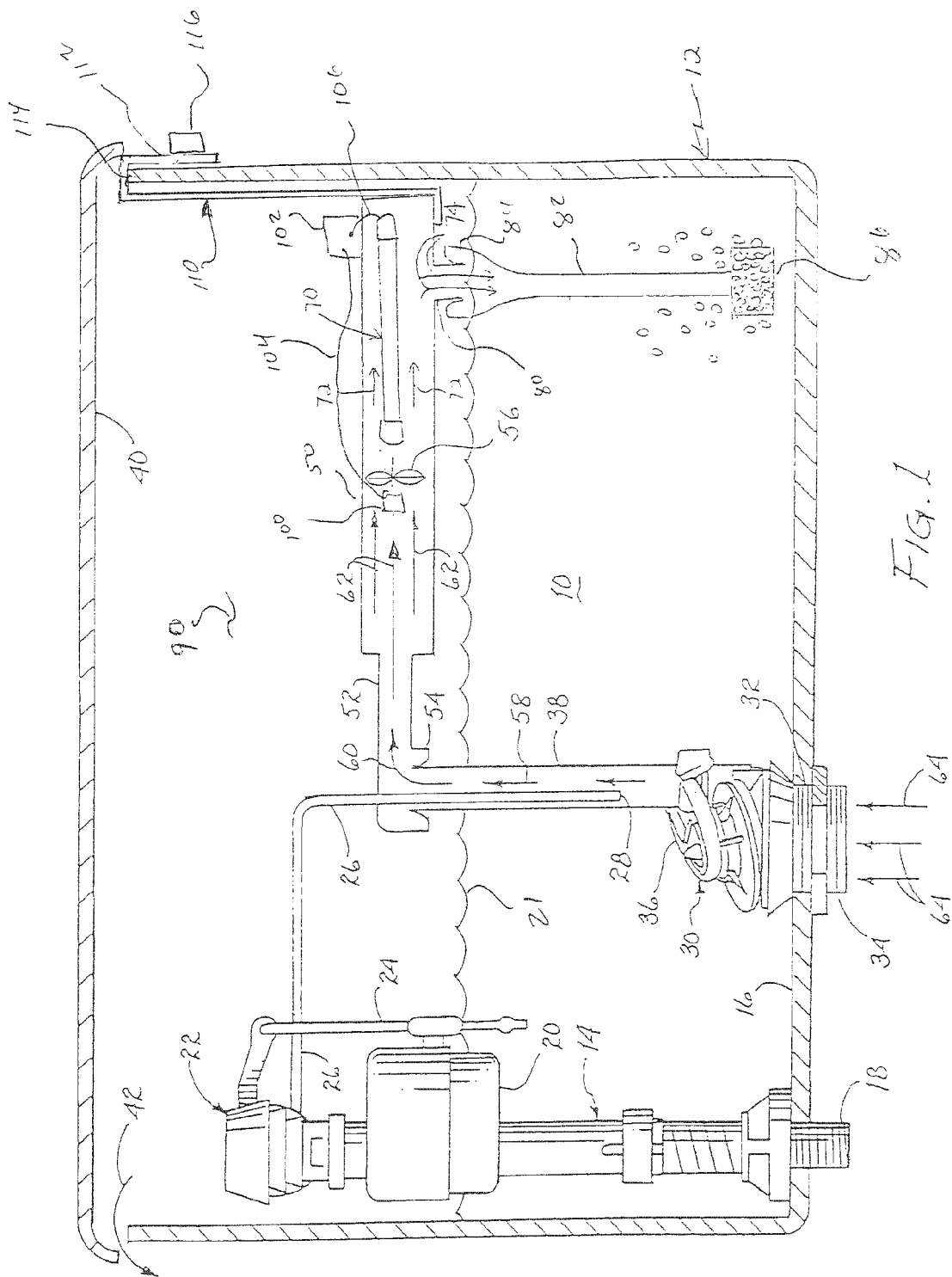

FIG. 1 illustrates a functional representation of apparatus 10 embodying the present invention. The apparatus is intended for use with a conventional flush toilet having a toilet bowl and a water tank 12 for providing water to flush the toilet bowl. As is conventional, a float operated valve mechanism 14 is mounted at bottom 16 of tank 12 and a nipple 18, or the like, extends outside of the tank for interconnection with a source of water under pressure. Float 20 is vertically responsive to water level 21 within tank 12.

During a flushing operation, the water level will drop and so will the float. The resulting movement of the float will open a valve 22 interconnected with the float through linkages 24. A flapper valve 30 is mounted within aperture 32 in bottom 16 of tank 12 and controls outflow of water through a fitting 34 in fluid communication with the water distribution system within the toilet bowl. The flapper valve includes a valve 36 which is raised by a handle exterior of tank 12 and interconnected with the valve by a chain, cord or the like. Thus, to flush the toilet, the handle is partially rotated which results in the raising of valve 36. Thereafter, water will flow through the flapper valve into the toilet bowl. As the water level drops, valve 36 will reseat itself and seal the flapper valve against further outflow.

Inflow of water through valve mechanism 22 is directed in part through a conduit 26 having an outlet 28 within a stand pipe 36. Additionally, water will flow through an outlet of the valve mechanism to fill the tank in the conventional manner. Tank 12 includes a loosely fitting lid 40, as is conventional. Because of the loose fit, air may flow out between the upper edges of tank 12 and the lid, as represented by arrows 42.

Operation of apparatus 10 may be initiated and terminated by push buttons electrically connected to appropriate circuitry. Alternatively, operation of the apparatus may transition through the flush and fill phases by use of a timer or sensing device(s) which sense flushing and filling of tank 12.

Apparatus 10 includes a plenum 50, which may be a folded or a straight tube, as illustrated. A conduit 52 extends from the plenum and includes a shroud 54 that fits over the upper end of stand pipe 38, as illustrated. The stand pipe serves the standard function of preventing overflow of the tank. Conduit 26 may be penetrably mounted through conduit 52, as illustrated. An electrically operated fan 56 is disposed within plenum 50 draw to air flow from within standpipe 38.

In the initial phase illustrated, the fan draws air from the stand pipe, as represented by arrows 58, into conduit 52, as represented by arrow 60, and into the plenum, as represented by arrows 62. The air drawn through the stand pipe will cause a low pressure within the toilet bowl and air is drawn from within the toilet bowl into the stand pipe, as represented by arrows 64.

Downstream of fan 54 within plenum 50 there is disposed an ultraviolet lamp 70; however, the ultraviolet lamp may be upstream of the fan. Upon energization of the lamp, it will provide radiation in the ultraviolet wavelength range. Such radiation is well known to have germicidal and virucidal properties. Thus, the air flowing about the lamp, as represented by arrows 72, will convey bacteria and other living microorganisms that may be within the air within the toilet bowl past lamp 70 and become irradiated with ultraviolet radiation. As is well known, such radiation at a preferred wavelength will have a germicidal and virucidal effect upon irradiated bacteria. Additionally, the ultraviolet radiation may be in a wavelength range to cause conversion of oxygen molecules present in the air into ozone molecules as well as in a wavelength range which will kill bacteria and viruses. The presence of ozone within the air flowing through plenum 50 will have an oxidizing effect upon organic material conveyed by the air. Thus, any malodor caused by the bacteria, viruses and/or organic compounds will be eliminated by destruction of the bacteria/viruses and oxidation of organic compounds. The air flowing out of plenum 50, as represented by arrows 74, will be essentially odorless.

Plenum 50 includes an outlet conduit 80 for discharging ultraviolet radiated and ozone purified air. A tube 82 includes a fitting 84 for attachment to conduit 80. The tube extends downwardly below water level 21 in tank 12 and is terminated by a sparger 86, or the like, for discharging the gases in the plenum into the water. Such discharge of gases may be set to occur during the flush phase and during the water fill phase. Immersion of the sparger or other diffuser in the water will result in entrainment of ozone enriched purified gas in the water within tank 12.

The entrained ozone molecules will have the effect of oxidizing organic matter that it may come in contact with and thereby purify the water to oxidize a significant part of any organic material that may be present. Furthermore, the ozone enriched water in the water tank is discharged into the toilet bowl during and after flushing to oxidize, destroy and reduce residual germs, bacteria and organic matter that are retained in the microstructure of the ceramic of the toilet bowl and thereby keep the toilet bowl cleaner.

Any ozone enriched gas that percolates upwardly through the water in tank 12 will become mixed with the air in head space 90. The presence of ozone molecules within the head space will have the beneficial effect of oxidizing any organic matter that may be present, such as odor producing organic material or microorganisms.

The air percolating upwardly through the water into head space 90 will be exhausted through the spaces between lid 40 and the tank, as represented by arrows 42.

In the event plenum 50 is of ultraviolet transmissive material, such as quartz, radiation from ultraviolet lamp 70 will have the beneficial effect of irradiating the air within the head space. There may also be irradiation of the water to some depth depending upon the distance of the water level below the plenum. With appropriate selection of the wavelength range of the ultraviolet light, it will have a germicidal and virucidal effect upon any microorganisms that may be present in the air within head space 90. Moreover, the ultraviolet light may also have an oxidizing effect on organic matter that may be present in the air within the head space.

During the flush phase, the conventional handle external of tank 12 is pivoted causing valve 36 of flapper valve 30 to open and water from within tank 12 will flow through fitting 34 into the toilet bowl. As float 20 of valve mechanism 14 moves downwardly in response to the water evacuation from tank 12, valve 22 opens and water begins to flow through conduit 26 through outlet 28 in stand pipe 38 and ultimately into the toilet bowl. Additionally, the normal outlet of valve mechanism 14 will discharge water into tank 12 to fill it. When a toilet is flushed, germs, bacteria and organic matter remain in the toilet bowl, often contained in the water and/or attached to the porcelain surface of the toilet bowl that leaves residual germs, odors and organic matter in the toilet. During the flush mode, fan 56 may be energized to draw air from the toilet bowl, as depicted by arrows 64, and into stand pipe 38, as depicted by arrow 58, and conduit 52, as depicted by arrow 60; this may reduce the aerosol normally migrating into the room. The air flowing through plenum 50, as represented by arrow 62, will be irradiated by ultraviolet radiation from lamp 70. Thereby, the germicidal and virucidal effect of the ultraviolet radiation, conversion of oxygen molecules to ozone molecules and the oxidizing effect of the ozone generated will be undertaken.

As would be evident to one skilled in the art, fan 56 is driven by an electric motor 100. As it is preferable that apparatus 10 be self contained and without electrical connection outside of toilet tank 12, a battery 102 may be employed. The battery is connected to motor 100 via electrical conductors 104. Similarly, power to UV lamp 70 is provided by the battery through electrical conductors 106.

A bracket 110 is representatively shown to support apparatus 10 within the toilet tank. As shown, the bracket may include a U-shaped element 112 engaging and receiving support from the top edge 114 of tank 12. Other support structures can also be used to support apparatus 10 within the toilet tank.

From the above description, it is apparent that apparatus 10 is totally self contained and requires no interaction with any elements, parts or other structure external of the water tank. Furthermore, when in place, apparatus 10 is essentially not visible to a user except to the extent that a control panel or switch(es) 116 for operating the apparatus may be available for tactile engagement. Such control panel or switch could be in electrical engagement (e.g. electrical conductors) with the fan and UV lamp.

I claim:

1. A toilet bowl water purifier adapted to be mounted within a water tank of a conventional flush toilet having a standpipe in fluid communication with the toilet bowl, a flapper valve for passing water to the toilet bowl from the water tank and a water fill tube extending from a valve mechanism responsive to the water level in the water tank for filling the tank, said water purifier comprising in combination:
   a) a plenum for accommodating a flow of air therethrough;
   b) a UV lamp disposed in said plenum for irradiating air within said plenum to kill microorganisms and to selectively convert oxygen molecules into ozone molecules and produce ozone enriched air for oxidizing organic matter present in the air and to kill bacteria and viruses that may be present in the air;
   c) a fan for urging a flow of air through said plenum;
   d) a conduit interconnecting the stand pipe with said plenum, whereby said fan draws air from the toilet bowl through the stand pipe into said plenum to subject the drawn air to radiation from said UV lamp;
   e) a further conduit extending from said plenum downwardly to a point below the normal water level within the water tank to convey the irradiated and ozone enriched gases into the water; and
   f) a device for automatically sensing a flush mode of the flush toilet and for causing the purifier to be energized only during the flush mode.

2. The water purifier as set forth in claim 1 including a diffuser disposed at the terminal end of said further conduit for discharging ozone enriched gas from said plenum to ozonate the water in the toilet tank.

3. The water purifier as set forth in claim 2 wherein said diffuser is a sparger.

4. The water purifier as set forth in claim 1, including a support for locating said water purifier within the toilet tank.

5. The water purifier as set forth in claim 1 including means for mounting said water purifier in the head space within the water tank.

6. A water purifier adapted to be mounted within a water tank of a conventional flush toilet having a standpipe in fluid communication with the toilet bowl, a flapper valve for passing water to the toilet bowl from the water tank and a water fill tube extending from a valve responsive to the water level in the water tank for filling the tank, said water purifier comprising in combination:
   a) a plenum for accommodating a flow of air therethrough;
   b) a UV lamp disposed in said plenum for irradiating air within said plenum to kill microorganisms and to selectively convert oxygen molecules into ozone molecules and produce ozone enriched air for oxidizing any organic matter than may be present in the air and for destroying bacteria and viruses that may be present in the air;
   c) a fan for urging a flow of air through said plenum;
   d) a conduit interconnecting the stand pipe with said plenum;
   e) a further conduit extending downwardly from said plenum and adapted to discharge the ozone enriched air into the water in the water tank; and
   f) said fan being automatically energized during a flush mode of the flush toilet to draw air from the toilet bowl through the stand pipe and into said plenum.

7. The water purifier as set forth in claim 6 including a diffuser disposed at the terminal end of said further conduit for entraining ozone enriched air in the water in the water tank.

8. The water purifier as set forth in claim 6 including means for mounting said water purifier within the head space.

9. A method for purifying the water in the water tank of a conventional flush toilet and for eliminating odor attendant use of the flush toilet, the toilet including a stand pipe and a valve mechanism for injecting water into the toilet tank as a function of the water level in the toilet tank with an apparatus mounted within the water tank of the toilet, said method comprising the steps of:
   a) drawing air from within the toilet bowl, through the stand pipe and through a plenum formed as part of the apparatus;
   b) exposing the air flowing through the plenum to a source of ultraviolet radiation to convert some of the oxygen molecules into ozone molecules and create ozone enriched air to promote oxidation of organic matter by the ozone molecules and to promote destroying any bacteria and viruses present in the air flowing through the plenum;
   c) entraining the ozone enriched air in the water in the toilet tank; and
   d) automatically sensing a flush mode of the flush toilet so as to cause the apparatus to be energized for performing the drawing, exposing and entraining steps only during the flush mode.

10. The method as set forth in claim 9, including the step of supporting the apparatus in the head space of the toilet tank.

11. The method as set forth in claim 9, including the step of exhausting the ozone enriched air from the plenum through a diffuser into the water in the toilet tank.

12. The method as set forth in claim 9 wherein the water tank includes a cover and wherein said step of exhausting includes the step of discharging ozone enriched air from the water tank between the water tank and the cover.

13. The method as set forth in claim 9, including the step of suspending the apparatus from the top edge of the water tank.

14. The method as set forth in claim 9, including the step of providing electric power from batteries supported by the apparatus.

15. A method for eliminating odors attendant a conventional flush toilet with an apparatus supported within the water tank of the toilet, said method comprising the steps of:
   a) drawing air from within the toilet into a plenum formed as part of the apparatus;
   b) irradiating the air within the plenum during exercise of said step of drawing with UV radiation to produce a stream of ozone enriched air exhausting from the plenum and to serve as a germicide and a virucide;
   c) entraining the ozone enriched air from the plenum in the water in the water tank; and
   d) automatically sensing a flush mode of the flush toilet so as to cause the apparatus to be energized for performing the drawing, irradiating and entraining steps only during the flush mode.

16. The method as set forth in claim 15, including the step of injecting the ozone enriched air through a diffuser into the water in the water tank.

17. The method as set forth in claim 15, including the step of providing direct current electric power supported by the apparatus to operate the apparatus.

18. A toilet bowl water purifier adapted to be mounted within a water tank of a conventional flush toilet, said water purifier comprising in combination:
   a) a plenum for accommodating a flow of air therethrough;
   b) a UV lamp disposed in said plenum for irradiating air within said plenum to selectively convert oxygen molecules into ozone molecules and produce ozone enriched air for oxidizing organic matter present in the air and to kill bacteria and viruses that may be present in the air;

c) a fan for urging a flow of air through said plenum;

d) an inlet to said plenum, whereby said fan draws air into said plenum to subject the drawn air to radiation from said UV lamp;

e) a conduit extending from said plenum downwardly to a point below the normal water level within the toilet tank to convey the irradiated and ozone enriched gases into the water to provide ozonated water in the toilet bowl: and f) a device for automatically sensing a flush mode of the flush toilet and for causing the water purifier to be energized only during the flush mode.

19. The water purifier as set forth in claim 18 including a diffuser disposed at the terminal end of said conduit for discharging ozone enriched gas from said plenum to ozonate the water in the toilet tank.

20. The water purifier as set forth in claim 19 wherein said diffuser is a sparger.

21. The water purifier as set forth in claim 18 including means for mounting said water purifier in the head space within the water tank.

22. A method for ozonating the water in the water tank and in the toilet bowl of a conventional flush toilet with an apparatus mounted within the water tank of the toilet, said method comprising the steps of:

a) drawing air through a plenum formed as part of the apparatus;

b) exposing the air flowing through the plenum to a source of ultraviolet radiation to convert some of the oxygen molecules into ozone molecules and create ozone enriched air to promote oxidation of organic matter by the ozone molecules and to promote destruction of any bacteria and viruses present in the air flowing through the plenum;

c) entraining the ozone enriched air in the water in the toilet tank for use as ozonated water in the toilet bowl; and d) automatically sensing a flush mode of the flush toilet so as to cause the apparatus to be energized for performing the drawing, exposing and entraining steps only during the flush mode.

23. The method as set forth in claim 22, including the step of supporting the apparatus in the head space of the toilet tank.

24. The method as set forth in claim 22, including the step of exhausting the ozone enriched air from the plenum through a diffuser into the water in the toilet tank.

25. The method as set forth in claim 22, including the step of supporting the apparatus from the top edge of the water tank.

26. The method as set forth in claim 22, including the step of providing electric power from batteries supported by the apparatus.

* * * * *